US 7,140,009 B2

(12) United States Patent
Tal et al.

(10) Patent No.: US 7,140,009 B2
(45) Date of Patent: Nov. 21, 2006

(54) UNROLLING TRANSFORMATION OF NESTED LOOPS

(75) Inventors: Arie Tal, Etobicoke (CA); Robert J. Blainey, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 702 days.

(21) Appl. No.: 10/294,938

(22) Filed: Nov. 14, 2002

(65) Prior Publication Data
US 2004/0003386 A1    Jan. 1, 2004

(30) Foreign Application Priority Data
Jun. 28, 2002    (CA) ................................ 2392122

(51) Int. Cl.
*G06F 9/45*    (2006.01)
(52) U.S. Cl. ..................... 717/160; 717/150; 717/151
(58) Field of Classification Search ............... 717/160, 717/161, 154, 156, 158, 141, 146, 148, 159; 703/14; 709/224; 712/241; 716/18
See application file for complete search history.

(56) References Cited

U.S. PATENT DOCUMENTS

| | | | |
|---|---|---|---|
| 5,797,013 A | | 8/1998 | Mahadevan et al. |
| 5,905,863 A | | 5/1999 | Knowles et al. |
| 5,950,007 A | * | 9/1999 | Nishiyama et al. ......... 717/161 |
| 6,035,125 A | * | 3/2000 | Nguyen et al. ............. 717/160 |
| 6,064,820 A | | 5/2000 | Subrahmanyam |
| 6,192,515 B1 | * | 2/2001 | Doshi et al. ................ 717/161 |
| 6,341,370 B1 | * | 1/2002 | Tirumalai et al. ........... 717/141 |
| 6,341,371 B1 | | 1/2002 | Tandri |
| 6,438,747 B1 | * | 8/2002 | Schreiber et al. ........... 717/160 |
| 6,507,947 B1 | * | 1/2003 | Schreiber et al. ........... 717/160 |
| 6,948,160 B1 | * | 9/2005 | Click et al. ................. 717/148 |

OTHER PUBLICATIONS

IEEE 1992, "Compiler Blockability of Numerical Algorithms" by S. Carr et al, pp. 114-124.
ACM 2000, "Optimized Unrolling of Nested Loops", by V. Sarkar, pp. 153-166.
ACM 1997, "Compiler Blockability of Dense Matrix Facorizations", by S. Carr pp. 336-361.

* cited by examiner

*Primary Examiner*—Wei Zhen
*Assistant Examiner*—Anna Deng
(74) *Attorney, Agent, or Firm*—Duke W. Yee; Herman Rodriguez; Wayne P. Bailey

(57) ABSTRACT

A transformation technique for nested loops. A virtual iteration space may be determined based on an unroll factor (UF). The virtual iteration space, which includes the actual iteration space, is fanned such that, the virtual iteration space may be evenly divided by a selected UF. Once the virtual iteration space has been calculated or determined, the virtual iteration space is "cut" into regular portions by one or more unroll factors. Portions of the actual iteration space which do not fill the cut portions of the virtual iteration space or which fall outside these cuts which have been evenly divided by the unroll factor form a residue which is calculated. The portions of the actual iteration space which remain arc also evenly divided by the unroll factor(s). An outer loop for this remaining portion of the actual iteration space is then unrolled. This unrolled portion forms a perfect nested loop.

43 Claims, 8 Drawing Sheets

UNROLLING TRANSFORMATION OF NESTED LOOPS

FIELD OF THE INVENTION

This invention relates generally to the optimization of computer instructions and, more particularly, to an unrolling transformation of nested loops.

BACKGROUND OF THE INVENTION

Generating computer code that is efficiently processed (i.e., "optimized") is one of the most important goals in software design and execution. Computer code which performs the desired function accurately and reliably but too slowly (i.e., code which is not optimized) is often discarded or unused by the computer users.

As those of ordinary skill in the art are aware, most source code (i.e., that code which is a human readable form) is typically converted into object code, and thereafter an executable application by use of a compiler and a linker. The executable application is in a form and language that is machine readable (i.e., capable of being interpreted and executed by a computer). Other languages, such as Java available from Sun Microsystems, Inc. of California, USA, may be in source code form that is, on execution, transformed into a form understood by a computer system which then executes the transformed instructions. In any case, the source code, when transformed into a form capable of being understood and executed by a computer system, is frequently optimized. That is, a transformation is performed such that the instructions are performed more efficiently (i.e., optimized) and, hopefully, without any undue delay.

One common structure found in source code is a loop. Nested loops—a loop within another loop—are also common in the art. Loops are used to repeat one or more operations or instructions. For example, an array may be used to store the purchase price of individual articles (e.g., where the $i^{th}$ element in the array A is denoted, in Fortran, as A(i)—other similar notations are used in other languages generate a single instruction to add each of the purchase prices together (e.g., sum=A(1)+A(2)+ . . . +A(n)). This however would take the programmer some time to code and is not easily adapted to the situation where the computer programmer does not know, at development time, the number of articles in the array. That is, when the number of elements in the array can only be determined at run time (i.e., during execution). Accordingly, the loop was developed to repeat an operation (e.g., sum=sum+A(i))) where the induction variable, i, is changed for each iteration. Other forms of loops are known and are equally applicable. However, when the instructions of loop are transformed into machine readable code (e.g., executable code), the executed instructions may not be processed efficiently. For the example above, some computer systems may require that the processor fetch from memory, rather than from a register or cache memory, the various elements of the array "A". Fetching data from memory requires the processor to wait while the data is retrieved. Also, while loops may be an efficient way to write certain repetitive source code operations, a loop does insert additional operations that would not be present if the repetitive operations were replicated. These additional operations (e.g., branching operations) are considered to be the loop "overhead".

To address some of the inefficiencies in processing loops, various optimization techniques have been created and applied. For example, one optimization technique is to unroll portions of the loop (hereinafter "unrolling"), replicate the portions and then insert the replicated portions into the code (also known as "jamming"). Typically, when the unroll and jam loop transformation technique is applied to the outer loop of a nested loop pair, the outer loop's induction variable (e.g., "i") is advanced only a few times (the number of times being governed by a parameter referred to as the unroll factor—UF) rather than completely during the unrolling portion of this optimization technique. During the jamming portion of this technique, the inner loop would be replicated "UF" times. Persons of ordinary skill in the art will appreciate that the replicated loop bodies are not identical but only similar. In the replicated loop bodies, portions of the loop bodies which use the induction of the outer loop will be advanced as required (e.g., if the loop body included reference to array element A(i), where "i" is the outer loop induction variable, a replicated loop body would include reference to the next required array element—A(i+1)). The unroll and jam technique effectively reorders the calculations being performed in the nested loop.

The "unroll and jam" technique does offer some advantages but also has some disadvantages.

One disadvantage of the unroll and jam technique is that residues are created. Residues form the portion of a loop that is would not be executed when the loop is unrolled by a fixed factor—the unroll factor. That is, since the controlling induction variable of the unrolled outer loop is advanced a fixed number of times in every iteration, if the upper bound does not divide evenly by the unroll factor (i.e., when there is a remainder or, the modulus of the upper bound of the outer loop induction variable "i" and the unroll factor is not zero), then code must be generated to address this remaining portion —the residue. Code generated to handle these residues may add overhead and inefficiencies that can result in performance degradation.

The unroll and jam technique, as a result of the creation of code to address the residue problem, introduces some significant disadvantages. Notable amongst these disadvantages is that the creation of the residue causes perfect triangular nested loops (i.e., nested loops where the inner loop induction variable—"j"—is bounded on the upper end by the value of the outer loop induction variable "i") to no longer be "perfect". As a result, other optimization techniques which are only applicable to perfect loop nests cannot be additionally applied. Therefore, using the unroll and jam technique eliminates use of many further optimization techniques.

Other optimization techniques known to those skilled in the art do not scale well. That is, the optimization techniques may provide some benefit when applied to a nested loop pair (i.e., only two dimensions). However, such techniques are not known to the inventors of the present invention to be applicable or easily applicable to nest loops of three or greater dimensions.

Accordingly, an optimization technique which addresses at least some of these shortcomings would be desirable.

SUMMARY OF THE INVENTION

The present invention is directed to a transformation technique for nested loops. In one aspect, embodiments of the invention calculate a virtual iteration space. The actual iteration space (hereinafter simply the "iteration space" or IS), is the space formed by the set of all of values of the induction variables in all of the iterations of the loop nest. Values which do not belong to some iteration of the loop nest do not form part of the iteration space. For example, in a simple nested loop formed by an outer loop having an induction variable "i" iterated in increments of one from a value of zero to a value "n" (i.e., i=0, n, 1) and an inner loop having an induction variable "j" iterated in increments of one from a value of zero to a value of "m" (i.e., j=0, m, 1), the iteration space would be composed of those values comprising the data sets (0, 0), (0, 1), (0, 2), . . . (0, m), (1, 0), (1, 1), . . . , (1, m), . . . (n, 0), (n, 1), . . . , (n, m).

The virtual iteration space is determined based on the unroll factor (UF). The virtual iteration space, which includes the actual iteration space, is formed such that, for a given UF, unrolling the outer loop of a rectangular nested loop pair would not result in any residues being formed.

Once the virtual iteration space has been calculated or determined, the virtual iteration space is "cut" into regular portions by one or more unroll factors. Portions of the actual iteration space which do not fill the cut portions of the virtual iteration space or which fall outside these cuts form a residue which is calculated. The portions of the actual iteration space which remain are also evenly divided by the unroll factor(s). An outer loop for this remaining portion of the actual iteration space is then unrolled. This unrolled portion forms a perfect nested loop. The operations for the unrolled remaining portion of the actual iteration space when combined with the operations for the residue of the actual iteration space is, in appropriate situations, semantically equivalent to the original nested loops. As those of ordinary skill in the art are aware, there are some instances where the unrolling of nested loops through application of the disclosed transformation and known transformation techniques (e.g., "unroll and jam") is not desirable. For example, where there is a dependency between a later operation and an earlier operation, reordering of these operations can result in an unrolled version of the nested loop being not semantically equivalent to the original nested loops.

Embodiments of the present invention applied to perfect triangular loop nests preserve this property thus enabling the loop nests optimized by embodiments of the present invention to be further optimized using additional optimization techniques known to those of ordinary skill in the art.

Embodiments of the invention provide code generated from the unrolling technique described and claimed herein to be compact and efficient thus providing numerous advantages that would be apparent to those of ordinary skill in the art.

In a further advantage of the present invention, embodiments of the invention can be applied to nested loops having three or more dimensions.

Advantageously, the unrolling transformation of nested loops technique described and claimed herein is adapted to handle a variety of nested loop structures. The unrolling transformation technique of the present invention is advantageously applicable to rectangular and triangular nested loops, and mixtures thereof. Moreover, aspects of the present invention are applicable not only to two-dimensional nested loops, but also to n-dimensional nested loops (where n>=2). These advantages result in embodiments of the invention transforming nested loops into compact code which in many instances is more efficiently processed.

In accordance with an aspect of the present invention there is provided a method for unrolling loops in a loop nest, said loop nest iterating over an actual iteration space of n-dimension, said method comprising accounting for residues, said residues comprising portions of said actual iteration space falling outside of, or incompletely overlapping with, cuts of a virtual iteration space, said virtual iteration space comprising said actual iteration space and said virtual iteration space evenly divided by an unrolling factor, said cuts and said virtual iteration space having n-dimensions; unrolling at least one outer loop of said loop nest, said unrolled outer loop bounded by cuts of said virtual iteration space falling completely within said actual iteration space.

In accordance with another aspect of the present invention there is provided a computer readable media storing data and instructions, said data and instructions, when executed, adapting a computer system to unroll loops in a loop nest, said nested loop nest iterating over an actual iteration space of n-dimension, said computer system adapted to account for residues, said residues comprising portions of said actual iteration space falling outside of, or incompletely overlapping with, cuts of a virtual iteration space, said virtual iteration space comprising said actual iteration space and said virtual iteration space evenly divided by an unrolling factor, said cuts and said virtual iteration space having n-dimensions; unroll at least one outer loop of said nested loop nest, said unrolled outer loop bounded by cutsslices of said virtual iteration space falling completely within said actual iteration space.

In accordance with still another aspect of the present invention there is provided a method for unrolling loops in a loop nest, said nested loop nest iterating over an actual iteration space of n-dimension, said method comprising means accounting for residues, said residues comprising portions of said actual iteration space falling outside of, or incompletely overlapping with, cuts of a virtual iteration space, said virtual iteration space comprising said actual iteration space and said virtual iteration space evenly divided by an unrolling factor, said cuts and said virtual iteration space having n-dimensions; means unrolling at least one outer loop of said nested loop nest, said unrolled outer loop bounded by cutsslices of said virtual iteration space falling completely within said actual iteration space.

In accordance with still another aspect of the present invention there is provided a compiled file corresponding to a source code file, said source code file comprising a nested loop nest iterating over an actual iteration space of n-dimension, said compiled file comprising machine readable instructions corresponding to said nested loop, said machine readable instructions comprising machine readable instructions accounting for residues, said residues comprising portions of said actual iteration space falling outside of, or incompletely overlapping with, cuts of a virtual iteration space, said virtual iteration space comprising said actual iteration space and said virtual iteration space evenly divided by an unrolling factor, said cuts and said virtual iteration space having n-dimensions; machine readable instructions unrolling at least one outer loop of said loop nest, said unrolled outer loop bounded by cuts of said virtual iteration space falling completely within said actual iteration space.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate an example embodiment of this invention.

DETAILED DESCRIPTION

It is to be understood that the particular orders of steps or operations described or shown herein are not to be understood as limiting the scope of the general aspects of the invention provided that the result for the intended purpose is the same. As will be understood by those skilled in the art, it is often possible to perform steps or operations in a different order yet obtain the same result. This is often particularly true when implementing a method of steps or operations using computer technology.

An appendix is attached hereto forming part of the present application which includes a paper by the inventors of the present invention entitled "An Outer Loop Unrolling Transformation on Perfect Triangular Loop Nests, Generating Compact Code and Preserving Perfect Nests". The paper forming the attached appendix describes and discloses embodiments of the present invention which are not limited simply to perfect triangular nests, as suggested by the title of the appended paper. The paper is to be submitted to a peer reviewed journal shortly after the filing of the present application.

Figure 1:
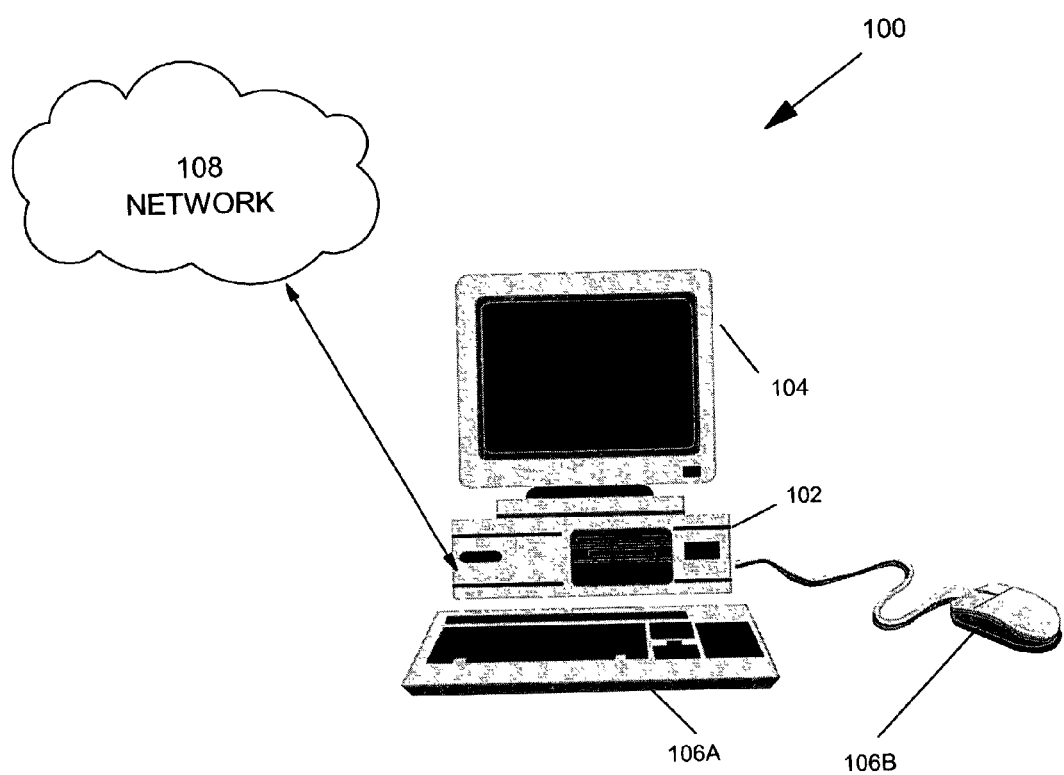
FIG. 1 schematically illustrates a computer system embodying aspects of the invention.

An embodiment of the invention, computer system 100, is illustrated in FIG. 1. Computer system 100, illustrated for exemplary purposes as a networked computing device, is in communication with other networked computing devices (not shown) via network 108. As will be appreciated by those of ordinary skill in the art, network 108 may be embodied using conventional networking technologies and may include one or more of the following: local area networks, wide area networks, intranets, public Internet and the like. As is discussed with reference to FIG. 8, computer system 100 may interact with other networked computer systems (not shown) providing application analysis of a distributed application.

Throughout the description herein, an embodiment of the invention is illustrated with aspects of the invention embodied solely on computer system 100. As will be appreciated by those of ordinary skill in the art, aspects of the invention may be distributed amongst one or more networked computing devices which interact with computer system 100 via one or more data networks such as, for example, network 108. However, for ease of understanding, aspects of the invention have been embodied in a single computing device—computer system 100.

Computer system 100 includes processing system 102 which communicates with various input devices 104, output devices 106 and network 108. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
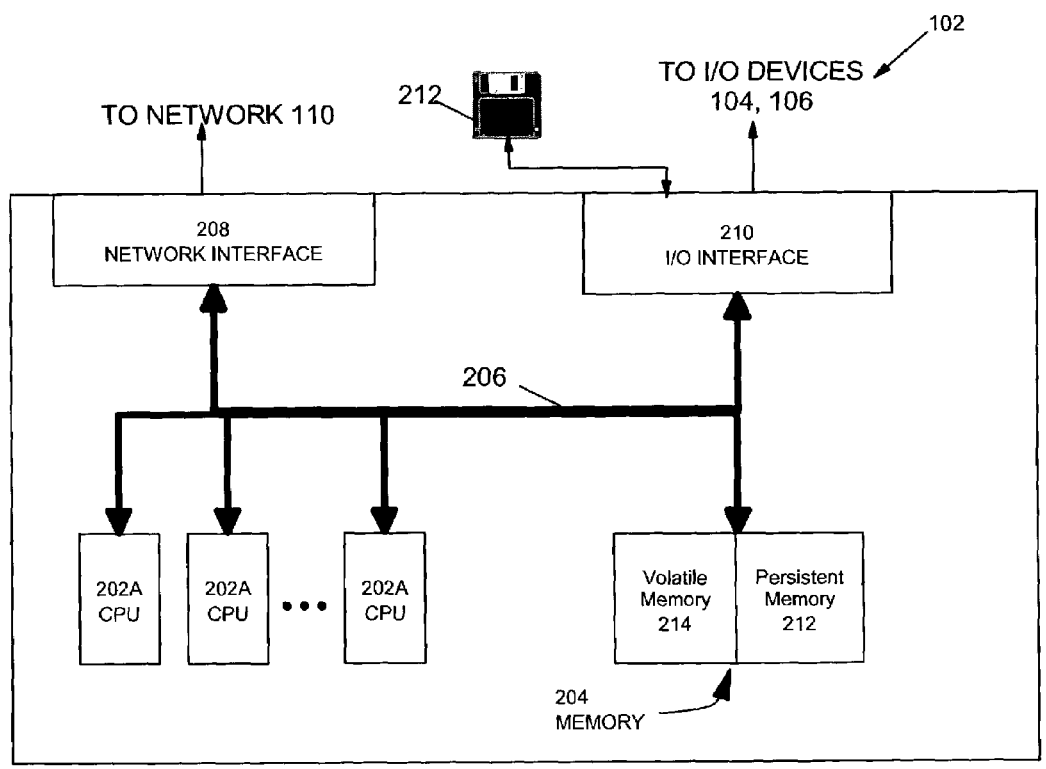
FIG. 2 schematically illustrates, in greater detail, a portion of the computer system of FIG. 1.

Exemplary processing system 102 is illustrated in greater detail in FIG. 2. As illustrated, processing system 102 includes several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of processing system 102.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between computer system 100 and other network computing devices (not shown) via network 108. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 108.

I/O I/F 210 enables communication between processing system 102 and the various I,O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
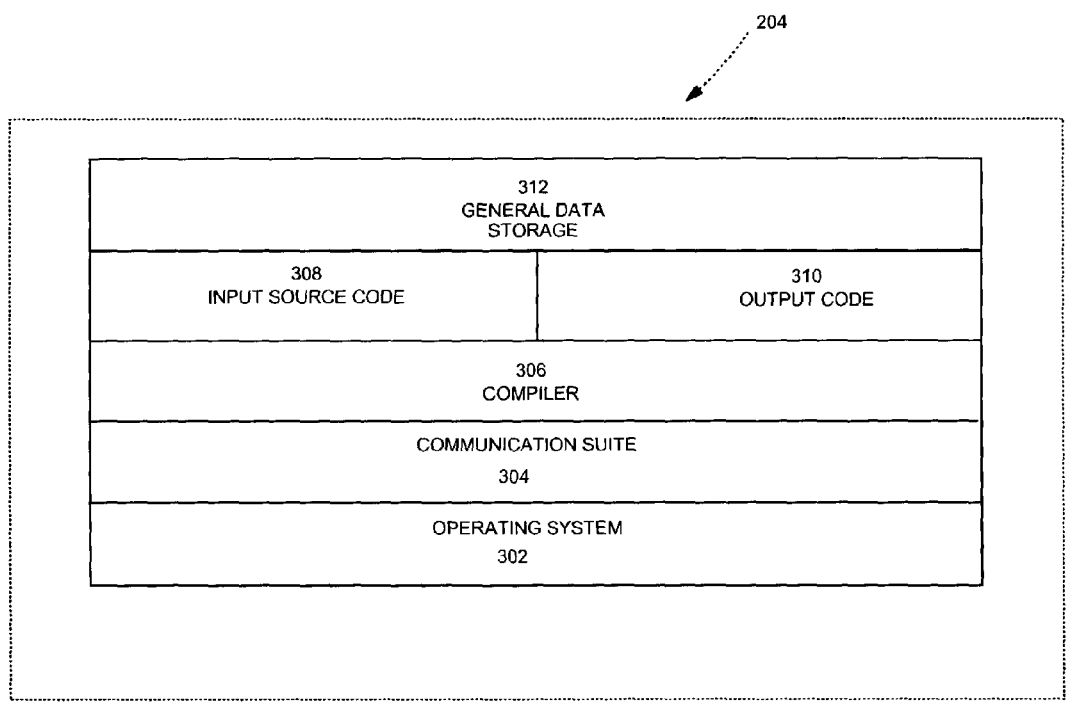
FIG. 3 illustrates, in functional block form, a portion of FIG. 2.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

As illustrated, for exemplary purposes only, memory 202 stores operating system (OS) 302, communications suite 304, compiler 306, input source file 308, output code 310 and general data storage area 312.

OS 302 is an operating system suitable for operation with a selected CPU 202 and the operations described herein. Multitasking, multithreaded OSes such as, for example, IBM AIX™, Microsoft Windows NT™, Linux or the like, are expected in many embodiments to be preferred.

Communication suite 304 provides, through, interaction with OS 302 and network I/F 208 (FIG. 2), suitable communication protocols to enable communication with other networked computing devices via network 108 (FIG. 1). Communication suite 304 may include one or more of such protocols such as TCP/IP, ethernet, token ring and the like.

Compiler 306 is adapted to receive input source code 308 and generate and output file 310. Compiler 306 identifies nested loops of "n" dimensions (where "n">=2) and modifies the identified nested loop by calculating any residue and unrolling the outer loop. The operations performed by compiler 306 are best understood with reference to the flow chart illustrated of FIG. 4 and the examples illustrated in FIGS. 5A, 5B, 6 and 7.

Input source code 308, as noted above, is conventional source code (any source code language including looping structures—e.g., for—next loops; for loops; while loops; loop untils; do loops; etc.) which includes a nested loop of "n" dimension (where "n">=2) where the upper and lower bounds of the loops are either loop nest invariant or are a linear function of some outer loop induction variable. An exemplary two dimensional nested loop having an outer loop with an induction variable "i" and an inner loop with an induction variable "j" is illustrated below as Nested Loop Source Code Example 1:

| Nested Loop Source Code Example 1 |
|---|
| for (i = 0; i < n; i++) |
|    for (j = 0; j < m; j++) |
|       loop body |
|    end for |
| end for |

In the example nested loop above, a rectangular iteration space is formed. The rectangular iteration space being comprised of the set of all the values in the induction variables in all the iterations of the loop nests. This example nested loop has a loop depth, or dimension, of 2. The rectangular iteration space defined by the above exemplary code is illustrated in FIG. 5A by solid lines.

Output code 310 is the output code generated by compiler 306 from the processing of input source code file 308. Typically, output code 310 will be either an object code file (that can be linked with other objects to create an executable file) or an executable file. Other forms of output file 310 (such byte codes) could equally be employed in alternative embodiments.

Figure 4:
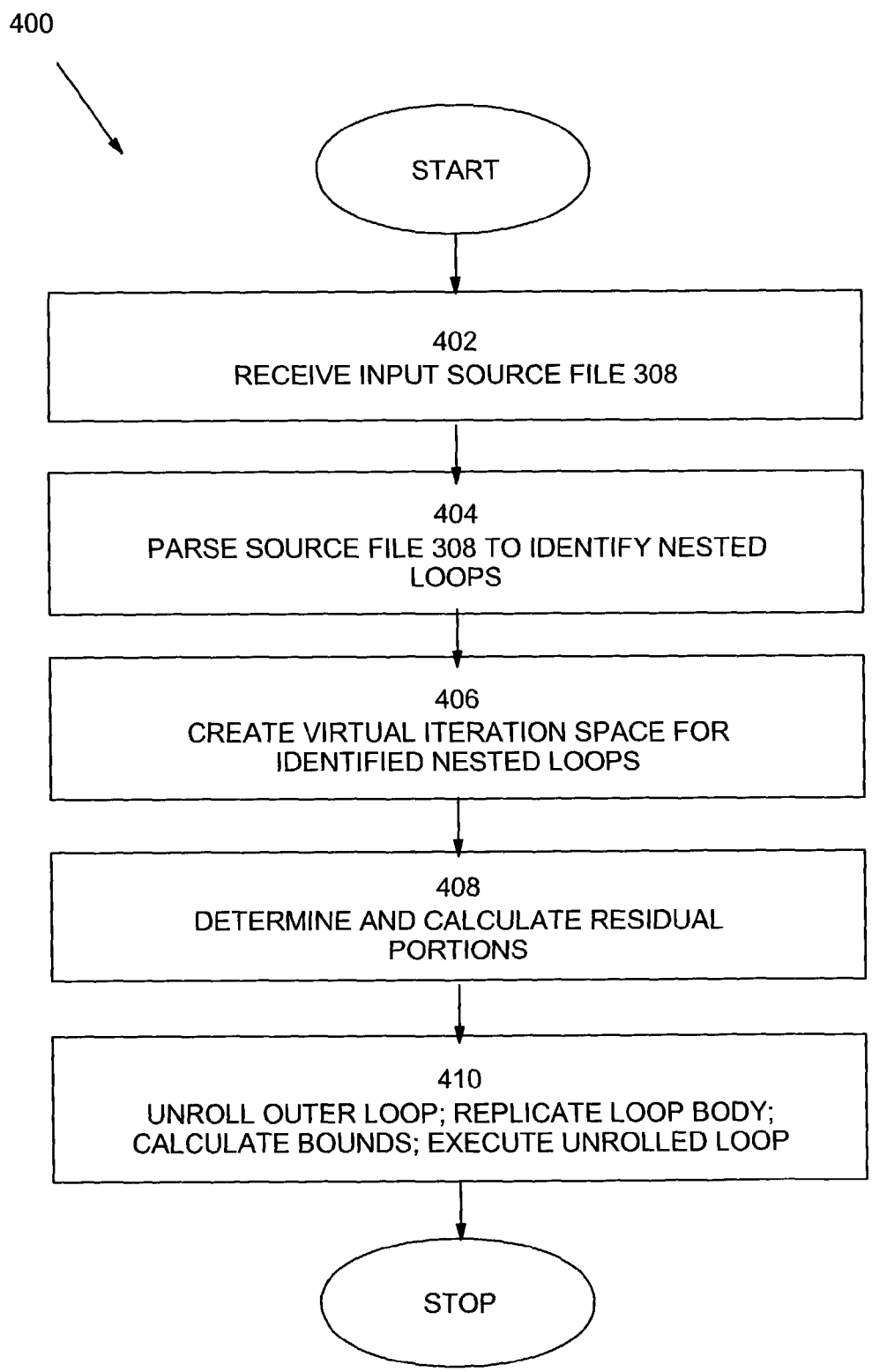
FIG. 4 is a flowchart of exemplary operations of the computer system of FIG. 1.
Figure 6:
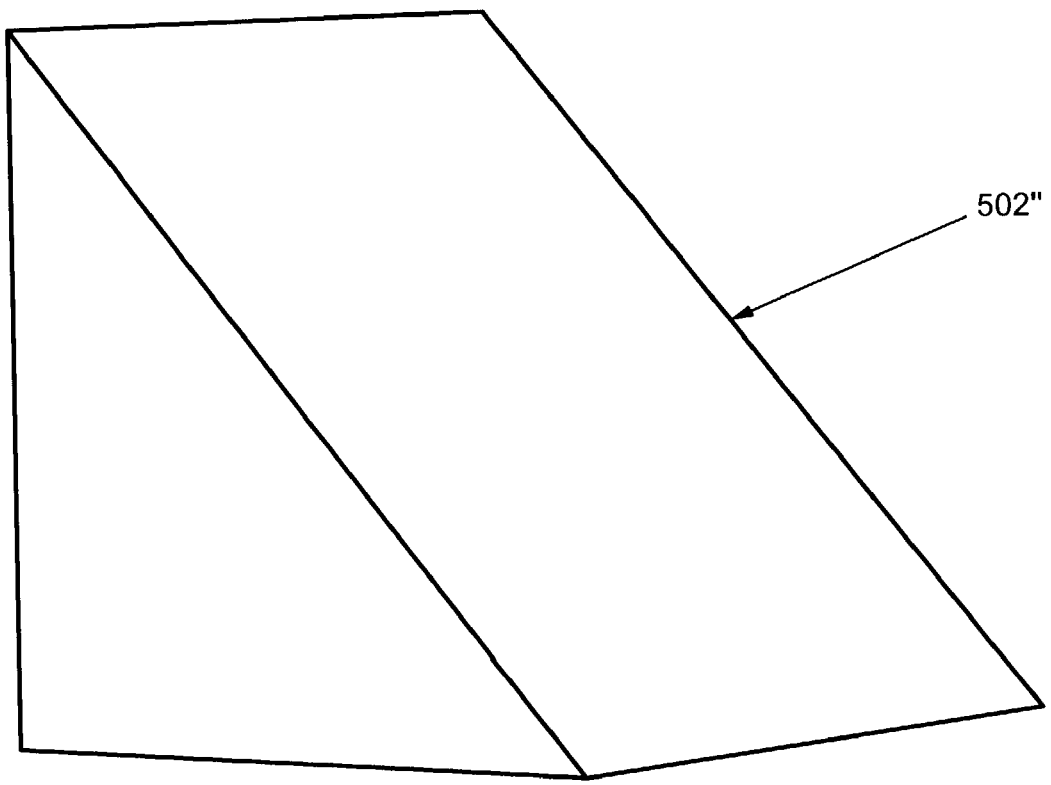
FIGS. 6 and 7 illustrate a three dimensional visualization of iteration spaces for an exemplary three dimensional nested loop processed during the operations illustrated in FIG. 4.
Figure 7:
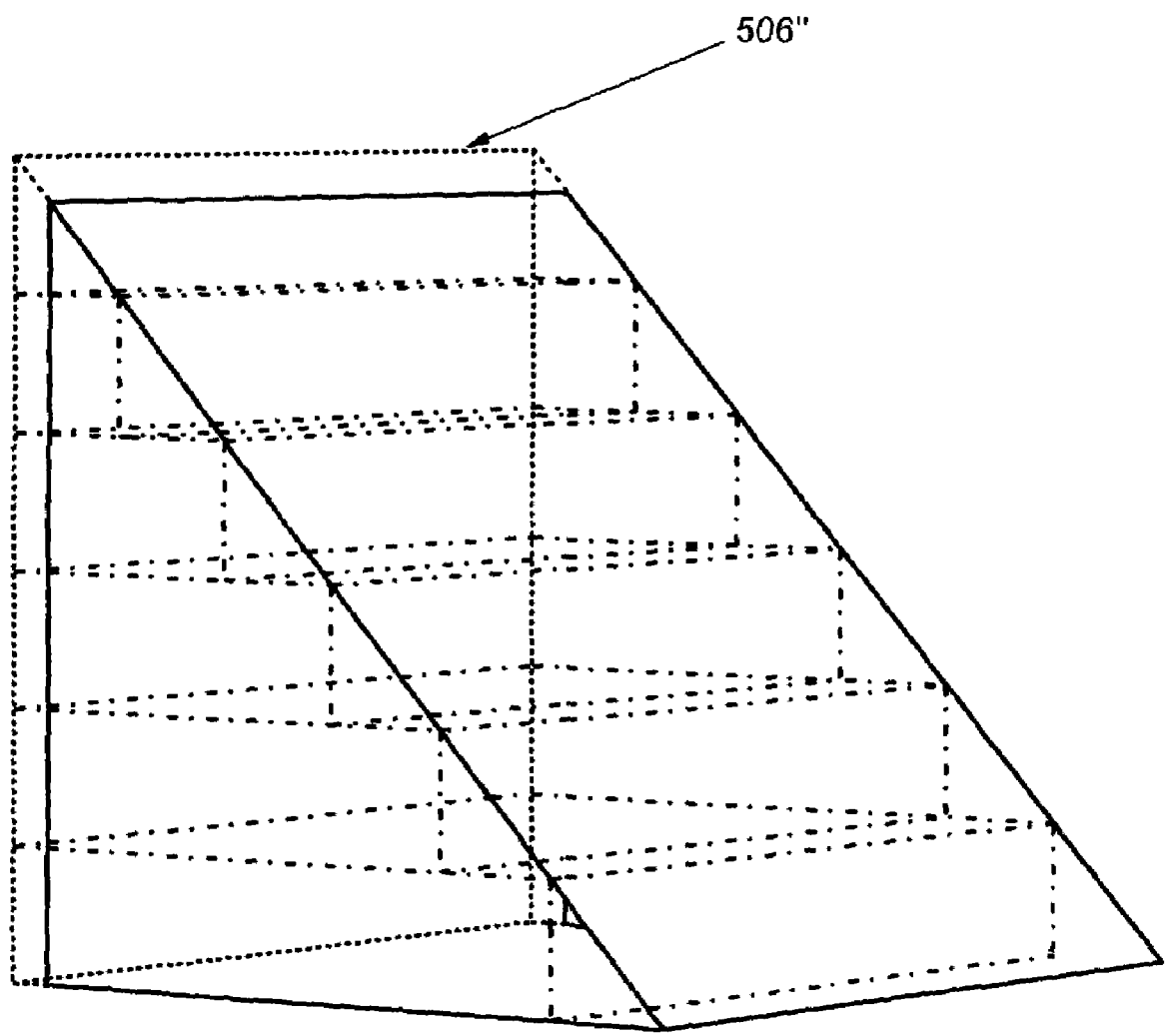

The operations 400 performed by compiler 306 are illustrated in a flow chart in FIG. 4. References will be made to FIGS. 5A and 5B which are visualizations of the operations performed by compiler 306 illustrated in FIG. 4. While operations 400 are applicable to nested loops of any depth greater than, or equal to, two, the visualizations in FIGS. 5A and 5B are of depth two. FIGS. 6 and 7 illustrate a visualization of the iteration space of nested loops having a depth of three.

Figure 5A:
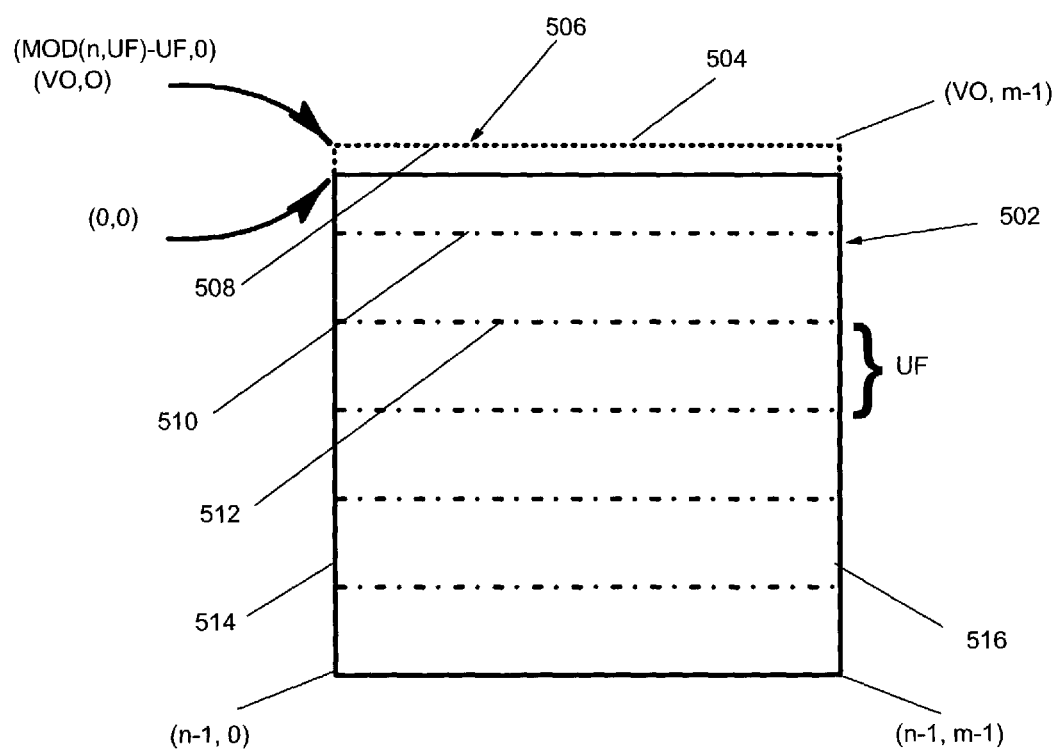
FIGS. 5A and 5B illustrate two dimensional visualizations of iteration spaces for exemplary nested loops exemplary of nested loops processed during the operations illustrated in FIG. 4.
Figure 5B:
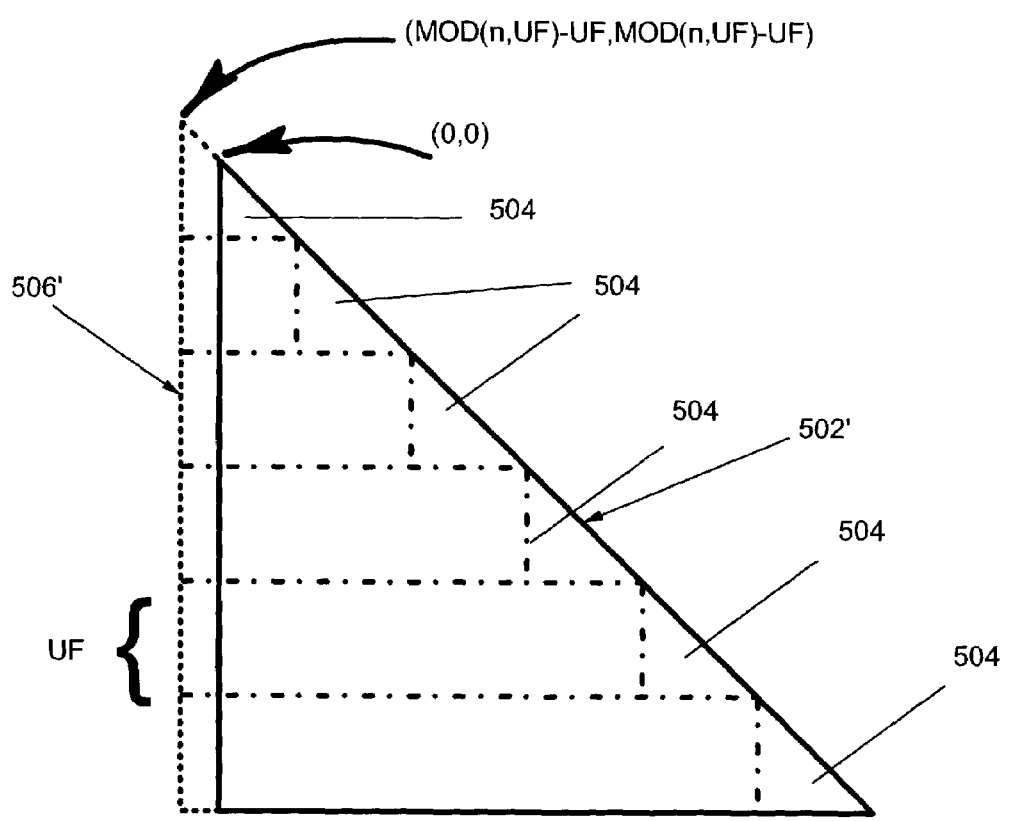

FIG. 5A is a visualization of the rectangular iteration space which can be created by Nested Loop Source Code Example 1 (above) and FIG. 5B being a visualization of a triangular iteration space which can be created by Nested Loop Source Code Example 2 (below). It must be noted that the iteration space comprises discrete points within the visualizations illustrated in FIGS. 5A and 5B since the induction variables do not include all real numbers within the upper and lower bounds but only discrete values within those bounds.

| Nested Loop Source Code Example 2 |
|---|
| for (i = 0; i < n; i++) |
|    for (j = 0; j < i; j++) |
|       loop body |
|    end for |
| end for |

On receipt of an input source code file 308 (402), compiler 306 identifies any nested loops (404). The receipt and parsing of source code file 308 to identify nested loops is known to those of ordinary skill in the art.

Once a nested loop has been identified (404), a virtual iteration space 506 (FIG. 5A) which includes the actual iteration space 502 (FIG. 5A) is determined (406). The iteration space defined by the exemplary nested loops in code examples 1 and 2 can be visualized as rectangular (see the solid line portion of FIG. 5A) or triangular (see solid line portion of FIG. 5B), respectively. As noted above, the virtual iteration space used is dependent upon the unrolling factor UF. The unroll factor will in most instances be determined by the compiler 306, user input, or preferably a combination of the two. In the present embodiment, the unroll factor is determined by compiler 306. Compiler 306 uses an algorithm based on factors related to the hardware on which output file 310 is to be execute to determine a reasonably efficient unroll factor. The unroll factor determined by compiler 306 may be overridden by specific user input. The virtual iteration space is illustrated in as dotted lines in the visualizations of FIGS. 5A and 5B. The distance between the dashed-dotted lines illustrates the UF for the exemplary visualizations.

In the visualizations of two and three dimensional iteration spaces of FIGS. 5–7, the following convention is followed: solid lines indicate the actual iteration space 502; dotted lines indicate the virtual iteration space 506; and dashed-dotted lines (e.g., line 510 in FIG. 5A) illustrates slices or cuts of virtual iteration space 506.

The virtual iteration space is selected such that the unrolling factor will result in the virtual iteration space being divided into equal sized portions. To determine the virtual iteration space for a rectangular iteration space, the unroll factor (UF) is used to determine the next value greater than "n" (the upper bound of the outer loop) which is evenly divisible by UF. When the nested loops are normalized, the virtual iteration space is bounded by the rectangle having vertices at {(VO, 0), (n–1, 0), (VO, m–1), (n–1, m–1)} where VO is the Virtual Origin of the virtual iteration space and is illustrated in FIG. 5A. The virtual origin is defined by the following equation:

$$VO = \text{modulus}(n, UF) - UF \qquad \text{Eq. 1}$$

In the rectangular nested loop situation, the virtual origin point is located at (VO, 0).

By creating the virtual iteration space 506 (FIG. 5A), the virtual iteration space can be evenly divided by the unroll factor (UF). The unroll factor is used to slice or cut the virtual iteration space into rectangular portions (hereinafter referred to as "rectangular cuts" or "cuts"). Where the actual iteration space 502 only overlaps a portion of a cut of the virtual iteration space 506, a residue will be created. In the preferred embodiment, any residues are calculated first (408). More generally, residues are created when portions of the actual iteration space which fall outside of a rectangular cut of the virtual iteration space. It is to be noted that the virtual iteration space itself includes the entirety of the actual iteration space. However, the iteration space formed only of the aggregation of the rectangular cuts will in most situations not include the entirety of the actual iteration space (this does not occur when the actual iteration space is rectangular since all slices of the virtual iteration space terminate exactly on the right 516 and left 514 boundaries of the actual iteration space). In the rectangular iteration space illustrated in FIG. 5A this residue portion is visualized as the small portion bounded by solid line 508 and the dashed-dotted line 510. This residue portion overlaps only partially with the portion of the virtual iteration space 506 bounded by upper dotted line 504 and the lower dashed-dotted line 510. The residue portion calculated in operation 408 is bounded, for the outer loop induction variable, by the origin (0) and the modulus of the upper bound of the induction variable and the unroll factor (i.e., mod (n, UF); which is written in the appendix as "n % UF").

Once the residue portion has been accounted, the outer loop can be unrolled, the loop body replicated (thus creating a "UF" number of loop bodies) and jammed into the unrolled loop (410). The outer loop will be traversed starting from the first portion (or cut) of the virtual iteration space which is completely overlapped by a similar portion of the actual iteration space. In the visualized iteration spaces of FIG. 5A. The first cut of the virtual iteration space which is completely overlapped by a portion of the actual iteration space commences at the point (mod (n,UF), 0). That is, the lower bound of the outer loop is bounded by line 510. That is, the unrolled outer loop is bounded by those slices of the virtual iteration space which fall completely within the actual iteration space. Once the bounds of the unrolled outer loop have been determined, the unrolled loop can be executed.

It is to be noted that due to the nature of unrolling and replicating the main loop body, the operations performed during the main unrolled loop (which correspond to the replicated portions of the loop body) form a rectangular slice. An exemplary of a rectangular slice is bounded on the upper edge by line 510 and the lower edge by line 512 and have a "height" of UF.

For the rectangular iteration space formed by the nested loop source code of example 1 (above), operations 400 will generate and execute the following unrolled source code:

---

Unrolled Loop Source Code Example 1

---

```
/* Residue Loop */
for (i = 0; i < mod (n, UF); i++)
    for (j = 0; j < m; j++)
        loop body
    end for
end for
/* Main Unrolled Loop */
for (i = mod (n, UF); i < n; i+=UF)
    for (j = 0; j < m; j++)
        /* UF number of Loop Bodies created */
        loop body; /* for values of i */
        loop body; /* for values of i + 1 */
        . . .
        loop body; /* for values of i + UF − 1 */
    end for
end for
```

---

As will be apparent by those of ordinary skill in the art, the source code generated by operations 400 creates a nested loop (identified by the heading comment "/* Main Unrolled Loop */") which is perfect and, thus, additional optimization techniques can be applied to this portion. As will be noted, the residues are also calculated by a perfect loop nest. Accordingly, transformation techniques (including the transformation technique described herein) could be applied to the loop nest employed to calculate the residue. However, in most instances, the residue nest loops are likely to take a relatively small amount of time to calculate as compared to the main unrolled loop portion. Accordingly, transforming the residue loop nest is unlikely to achieve (in most instances, but not all) any significant efficiency advantages. It is to be further noted that the complete source code for the unrolled loop (as illustrated in one embodiment in the Unrolled Loop Source Code Example 1, above) is considerably more efficient than those presently known.

As will be appreciated, in alternative embodiments of the present invention, the residue(s) could be calculated after the unrolled loop. However, this will result in the lower bound formula having to be modified in these alternative embodiments. The embodiments described herein use the above-noted lower bound out of convenience—since compiler 306 will generate output source code with the loops starting from zero after loop normalization. Additionally, it may be preferable to calculate the residue first as there may be some calculations performed in the unrolled nested loop portion which are dependent upon a residue.

The virtual iteration space for triangular nested loops is slightly more complicated. FIG. 5B illustrates both the actual iteration space 502' (shown by solid lines) and the virtual iteration space 506' (shown by dotted lines). As with the rectangular example, the virtual iteration space is evenly divided by the unroll factor.

The operations performed by compiler 306 to determine the virtual iteration space (406) is governed by the selection of a virtual origin point such that the range of the induction variable for the outer loop of the virtual iteration space is evenly divided by the unroll factor—UF. As before, the virtual origin VO (for the outer induction variable) for the two dimensional case is governed by equation (1) (above).

However, with a triangular iteration space, the residue will not be as simple as in the rectangular case (which generated a residue which itself was a simple rectangle). Rather, the residue generated by embodiments of the present invention applied to triangular nested loops will comprise similarly shaped (i.e., triangular) residues. The residues for the iteration space of a triangular nested loop are identified in FIG. 5A as triangular residues 504. The triangular shaped residues result from the creation of rectangular cuts (described above with reference to the rectangular iteration space) that result from the unrolling of the outer loop for the main nested loop (see the Unrolled Main Loop Source Code Example 2, below). The triangular residues will be of the same size in the virtual iteration space. However, the first (top-most) residue is potentially of a smaller size in the actual iteration space (see FIG. 5B).

As will be appreciated, each residue 504 does not commence with the same lower bound (i.e., the starting value of "j" is different for each residue 504). Accordingly, the lower bound for each residue 504 is governed by the following equation:

$$j_{lower\ bound} = \max\ (0, i-mod(i+UF-mod(n,UF),UF)) \qquad \text{Eq. 2}$$

For example, given "n" having a value of seven (i.e., n=7, for i<n), and UF having a value of 2, the lower bounds for j, as calculated by the above noted equation (2), will be: 0, 1, 1, 3, 3, 5 and 5. Similarly, unlike the residue in the rectangular iteration space (of which there is only one), there are a plurality of residues 504 created in the triangular nested loop situation which commence at different lower bounds. As such, unlike the outer nested residue loop created for the rectangular case which iterates only over limited subset of the outer induction variable space, the outer induction variable ("i") for the residue nested loops must iterate over the entire iteration space so that each of the plurality of residues 504 is properly accounted. The residues in the triangular iteration space are located at different coordinates (i, j)—as compared to the rectangular nested loops. These different coordinates result from the diagonal line 510 which can be said to effect two dimensions.

As with the rectangular nested loops, after the virtual iteration space has been created for an identified nested triangular loop (404, 406), the residues will be calculated (408). For the exemplary triangular nested loop of example 2 (above), the residue calculation will be governed by the following source code (which uses Equation (2) above):

Residue Source Code Example 2

```
/* Residue Loop */
for (i = 0; i < n; i++)
    for (j = {Equation (2)}; j < i; j++)
        loop body
    end for
end for
```

The main nested loop (i.e., the perfect nested loops which are an unrolled version of the triangular nested loops) is generated (410) in a manner similar to that for the rectangular nested loop scenario as shown below:

Unrolled Main Loop Source Code Example 2

```
/* Main Unrolled Loop */
for (i = mod (n, UF); i < n; i+=UF)
    for (j = 0; j < i; j++)
        /* UF number of Loop Bodies created */
        loop body;
        loop body;
    end for
end for
```

As will be appreciated, the code generated from unrolling the triangular loop has resulted in both compact code (which can be efficiently executed) and a perfect nested loop for the main portion.

The above two exemplary two dimensional iteration spaces (a rectangular iteration space created from source code example 1, and a triangular iteration space created from source code example 2), can be combined to create n-dimensional (or n-depth) iteration spaces which, as with the two dimensional cases, will generate a residue for each unrolled loop.

The three dimensional rectangular loop nests and a mixed triangular and rectangular nested loops are explained in detail in the attached appendix. As will be understood by those of ordinary skill in the art, an n-dimensional loop nest could result in n−1 unroll factors being selected. It is to be noted that the unroll factor is used for two purposes: first, the unroll factor is used for computing the virtual iteration space and calculating the residues; second, the unroll factor is also used for unrolling the actual loop body.

In a triangular iteration space, iterating through the triangular residue has an effect on two dimensions (as described above). Accordingly, the same unroll factor should be used for both dimensions when calculating the virtual iteration space and the residues created therefrom. The common unroll factor that is used for those iteration spaces should be evenly divisible by each of the unroll factors (UF1 and UF2) that could be used for the dimensions at issue. The minimum common unroll factor that could be employed is the lowest common multiplier ("LCM") for those two dimensions affected by the diagonal of a triangular iteration space. As will be appreciated, other common unroll factors could be employed that are evenly divisible by each UF1 and UF2. While a common unroll factor is used to calculate the virtual iteration space and the residues, when the nested loops are actually unrolled, the original unroll factors (e.g., not the lowest common multiplier) can be employed.

It is to be further noted, the cuts of the actual iteration space (being of n-dimension) which are calculated during the execution of the unrolled nested loop structure generated by embodiments of the invention will also be of n-dimensions (e.g., a three dimensional nested loop will result in an embodiment of the invention generating an unrolled nested loop also being of three dimensions and the cuts of the actual iteration space calculated by this unrolled nested loop will be a rectangular prism of three-dimensions). Further, in the multi-dimensional triangular case, the factor determining VO could be, for example, LCM (UF1, UF2) since they are both involved with the same diagonal.

From the foregoing, and from an understanding of the materials included in the appendix attached hereto, persons of ordinary skill in the art will appreciate that aspects of the present invention are easily extended to applications where nested loops of n-dimensions (i.e., of depth "n") are identified. Embodiments of the invention will result in n-dimensional nested loops being unrolled to generate compact nested loops to address any residues and compact nested loops for the non-residue portion of the nested loops. Also, and more interestingly, a perfect nested loop will also be generated for the main loop body (i.e., the non-residue portions). It is from this perfect nested loop structure that most of the benefits of the present invention are obtained. Additionally, embodiments of the present invention result in output code having a relatively small number of residue nests. Moreover, embodiments of the present invention are advantageously able to handle multi-dimensional loop nests of rectangular, triangular or mixed rectangular and triangular loop nests.

As will be appreciated by those skilled in the art, modifications to the above-described embodiment can be made without departing from the essence of the invention.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

What is claimed is:

1. A computer-implemented method for unrolling loops in a loop nest, said loop nest iterating aver an actual iteration space of n-dimension, said method comprising:

accounting for residues, said residues comprising portions of said actual iteration space falling outside of, or incompletely overlapping with, cuts of a virtual iteration space, said virtual iteration space comprising said actual iteration space and said virtual iteration space evenly divided by an unrolling factor, said cuts and said virtual iteration space having n-dimensions;

unrolling at least one outer loop of said loop nest, said unrolled outer loop bounded by cuts of said virtual iteration space falling completely within said actual iteration space;

calculating a boundary of said virtual iteration space using said unrolling factor, wherein said unrolling factor is used to determine a next integer value greater than an upper bound of the outer loop which is evenly divisible by said unrolling factor.

2. The method of claim 1 wherein said accounting for residues comprises:

generating a residue loop nest, said residue loop nest iterating over said portion of said actual iteration space falling outside of, or incompletely overlapping with, cuts of said virtual iteration space.

3. The method of claim 2 wherein said residue loop nest comprises a perfect loop nest.

4. The method of claim 1 wherein said unrolling at least one outer loop of said loop nest comprises:

iterating over said at least one outer loop of said loop neat, the induction variable of said at least one outer loop being incremented by said unrolling factor;

replicating an inner portion of said loop nest, whereby the total number of said inner portions of said loop nest equal said unrolling factor.

5. The method of claim 1 wherein said loop nest comprises a two dimensional loop nest.

6. The method of claim 5 wherein said loop nest comprises a perfect triangular loop where at least one of an upper and lower bound of an inner loop is a linear function of an outer loop induction variable.

7. The method of claim 6 wherein said virtual iteration space is bounded by the modulus of an upper bound of the induction variable of said outer loop and said unrolling factor.

8. The method of claim 6 wherein said accounting for residues comprises:

generating a residue loop nest iterating over said portion of said actual iteration space falling outside of, or incompletely overlapping with, outs of said virtual iteration space, said residue loop nest comprising:

an outer residue loop; and
an inner residue loop;
an induction variable "i" for said outer residue loop bounded by the bounds of the induction variable of said outer loop; and
an induction variable "j" for said inner residue loop having a lower bound governed by the equation:

$$j_{lower\ bound} = \max(0, i - mod(+UF - mod(n, UF), UF)):$$

where "n" is the upper bound of said outer loop;
and said induction variable "j" for said inner residue loop having an upper bound governed by said induction variable for said outer residue loop.

9. The method of claim 5 wherein said loop nest comprises a rectangular loop.

10. The method of claim 9 wherein said virtual iteration space is bounded by the modulus of an upper bound of the induction variable of said outer loop and said unrolling factor.

11. The method of claim 10 wherein said accounting for residues comprises:

generating a residue loop nest iterating over said portion of sold actual Iteration space felling outside of, or incompletely overlapping with, cuts of said virtual iteration space, said residue loop nest comprising:

an outer residue loop; and
an inner residue loop;
an induction variable "i" for said outer residue loop comprising a lower bound of the induction variable of said outer loop and an upper bound governed by the modulus of an upper bound of the induction variable of said outer loop and said unrolling factor.

12. The method of claim 1 wherein said loop nest comprises at least one of: a rectangular and a triangular loop nest.

13. A computer readable media storing data and instructions, said data and instructions, when executed, adapting a computer system to unroll loops in a loop nest, said nested loop nest iterating over an actual iteration space of n-dimension, said computer system adapted to:

account for residues, said residues comprising portions of said actual iteration space falling outside of, or incompletely overlapping with, cuts of a virtual iteration space, said virtual iteration apace comprising said actual iteration space and said virtual iteration space evenly divided by an unrolling factor, said cuts and said virtual iteration space having n-dimensions;

unroll at least one outer loop of said nested loop nest, said unrolled outer loop bounded by cutsslices of said virtual iteration space falling completely within said actual iteration space;

calculate a boundary of said virtual iteration space using said unrolling factor, wherein said unrolling factor is used to determine a next integer value greater than an upper bound of the outer loop which is evenly divisible by said unrolling factor.

14. The computer readable media of claim 13 wherein said adaptation to account for residues comprises adapting said computer system to:

generate a residue loop nest, said residue loop nest iterating over said portion of said actual iteration space falling outside of, or incompletely overlapping with, cuts of said virtual iteration space.

15. The computer readable media of claim 14 wherein said residue loop nest comprises a perfect loop nest.

16. The computer readable media of claim 13 wherein said adaptation to unroll at least one outer loop of said loop nest comprises adapting said computer system to:

iterate over said at least one outer loop of said loop nest, the induction variable of said at least one outer loop being incremented by said unrolling factor, replicate an inner potion of said loop nest, whereby the total number of said inner portions of said loop nest equal said unrolling factor.

17. The computer readable media of claim 13 wherein said loop nest comprises a two dimensional loop nest.

18. The computer readable media of claim 17 wherein said loop nest comprises a perfect triangular loop where at least one of an upper and lower bound of an inner loop is a linear function of an outer loop induction variable.

19. The computer readable media of claim 18 wherein said virtual iteration space is bounded by the modulus of an upper bound of the induction variable of said outer loop and said unrolling factor.

20. The computer readable media of claim 18 wherein said adaptation to account for residues comprises adapting said computer system to:

create a residue, loop neat iterating over said portion of said actual iteration space falling outside of, or incompletely overlapping with, cuts of said virtual iteration apace, said residue loop nest comprising:
an outer residue loop; and
an inner residue loop;
an induction variable "i" for said outer residue loop bounded by the bounds of the induction variable of said outer loop; and
an induction variable "j" for said inner residue loop having a lower bound governed by the equation:

$$j_{lower\ bound} = \max(0, i - mod(i + UF - mod(n, UF), UF));$$

where "n" is the upper bound of said outer loop;
and said induction variable "j" for said inner residue loop having an upper bound governed by said induction variable for said outer residue loop.

21. The computer readable media of claim 17 wherein said loop nest comprises a rectangular loop.

22. The computer readable media of claim 21 wherein said virtual iteration space is bounded by the modulus of an upper bound of the induction variable of said outer loop and said unrolling factor.

23. The computer readable media of claim 22 wherein said adaptation to account for residues comprises adapting said computer system to:
generate a residue loop nest iterating over said portion of said actual iteration space falling outside of, or incompletely overlapping with, cuts of said virtual iteration space, said residue loop nest comprising:
an outer residue loop; and
an inner residue loop;
an induction variable "i" for said outer residue loop comprising a lower bound of the induction variable of said outer loop and an upper bound governed by the modulus of an upper bound of the induction variable of said outer loop and said unrolling factor.

24. The computer readable media of claim 13 wherein said loop nest comprises at least one of: a rectangular and a triangular loop nest.

25. A computer-implemented method for unrolling loops in a loop nest, said nested loop nest iterating over an actual iteration space of n-dimension, said method comprising:
means accounting for residues, said residues comprising portions of said actual iteration space failing outside of, or incompletely overlapping with, cuts of a virtual iteration space, said virtual iteration space comprising said actual iteration space and said virtual iteration space evenly divided by an unrolling factor, said cuts and said virtual iteration space having n-dimensions;
means unrolling at least one outer loop of said nested loop nest, said unrolled outer loop bounded by cutsslices of said virtual iteration space falling completely within said actual iteration space;
means for calculating a boundary of said virtual iteration space using said unrolling factor, wherein said unrolling factor is used to determine a next integer value greater than an upper bound of the outer loop which is evenly divisible by said unrolling factor.

26. The method of claim 25 wherein said means for accounting for residues comprises:
moans for generating a residue loop nest, said residue loop nest iterating over said portion of said actual iteration space falling outside of or incompletely overlapping with, cuts of said virtual iteration space.

27. The method of claim 26 wherein said residue loop nest comprises a perfect loop nest.

28. The method of claim 25 wherein said means for unrolling at least one outer loop of said loop nest comprises:
means for iterating over said at least one outer loop of said loop nest, the induction variable of said at least one outer loop being incremented by said unrolling factor;
means for replicating an inner portion of said loop nest whereby the total number of said inner portions of said loop nest equal said unrolling factor.

29. The method of claim 25 wherein said loop nest comprises a two dimensional loop nest.

30. The method of claim 29 wherein said loop nest comprises a perfect triangular loop where at least one of an upper and lower bound of an inner loop is a linear function of an outer loop induction variable.

31. The method of claim 30 wherein said virtual iteration space is bounded by the modulus of an upper bound of the induction variable of said outer loop and said unrolling factor.

32. A compiled file corresponding to a source code file, said source code file comprising a nested loop nest iterating over an actual iteration space of n-dimension, said compiled file comprising machine readable instructions corresponding to said nested loop, said machine readable instructions tangibly embodied in a tangle computer readable medium and comprising:
machine readable instructions accounting for residues, said residues comprising portions of said actual iteration space falling outside of, or incompletely overlapping with, curs of a virtual iteration space, said virtual iteration space comprising said actual iteration space and said virtual iteration space evenly divided by an unrolling factor, said cuts and said virtual iteration space having n-dimensions;
machine readable instructions unrolling at least one outer loop of said loop nest said unrolled outer loop bounded by cuts of said virtual iteration space falling completely within said actual iteration space;
machine readable instructions for calculating a boundary of said virtual iteration space using said unrolling factor, wherein said unrolling factor is used to determine a next integer value greater than an upper bound of the outer loop which is evenly divisible by said unrolling factor.

33. The compiled file of claim 32 wherein sold machine readable instructions accounting for residues comprises:
machine readable instructions for a residue loop nest, said residue loop nest iterating over said portion of said actual iteration space falling outside of or incompletely overlapping with, cuts of said virtual iteration space.

34. The compiled file of claim 33 wherein said residue loop nest comprises a perfect loop nest.

35. The compiled file of claim 32 wherein said machine readable instructions unrolling at least one outer loop of said loop nest comprises:
machine readable instructions iterating over said at least one outer loop of said loop nest, the induction variable of said at least one outer loop being incremented by said unrolling factor;
machine readable instructions iterating over replicated inner portions of said loop nest, whereby the total number of said inner portions of said loop nest equal said unrolling factor.

36. The compiled file of claim 35 wherein said loop nest comprises a two dimensional loop nest.

37. The compiled file of claim 36 wherein said loop nest comprises a perfect triangular loop where at least one of an upper and lower bound of an inner loop is a linear function of an outer loop induction variable.

38. The compiled file of claim 37 wherein said virtual iteration space is bounded by the modulus of an upper bound of the induction variable of said outer loop and said unrolling factor.

39. The compiled file of claim 37 wherein said machine readable instructions accounting for residues comprises:

machine readable instructions for a residue loop nest iterating over said portion of said actual iteration space falling outside of, or incompletely overlapping with, cuts of said virtual iteration space, said residue loop nest comprising:

an outer residue loop; and an inner residue loop;

an induction variable "i" for said outer residue loop bounded by the bounds of the induction variable of said outer loop; and an induction variable "j" for said inner residue loop having a lower bound governed by the equation:

$$j_{lower\ bound} = \max(0, i - mod(i + UF - mod(n, UF), UF));$$

where "n" is the upper bound of said outer loop;

and said induction variable "j" for said inner residue loop having an upper bound governed by said induction variable for said outer residue loop.

40. The compiled file of claim 37 wherein said loop nest comprises a rectangular loop.

41. The compiled file of claim 40 wherein said virtual iteration space is bounded by the modulus of an upper bound of the induction variable of said outer loop and said unrolling factor.

42. The compiled file of claim 41 wherein said machine readable instructions accounting for residues comprises:

machine readable instructions for a residue loop nest iterating over said portion of said actual iteration space falling outside of, or incompletely overlapping with, cuts of said virtual iteration space, said residue loop nest comprising;

an outer residue loop; and an inner residue loop;

an induction variable "i" for said outer residue loop comprising a lower bound of the induction variable of said outer loop and an upper bound governed by the modulus of an upper bound of the induction variable of said outer loop and said unrolling factor.

43. The compiled file claim 32 wherein said loop nest comprises at least one of: a rectangular and a triangular loop nest.

* * * * *